United States Patent [19]

Aoshima et al.

[11] Patent Number: 4,825,704

[45] Date of Patent: May 2, 1989

[54] FLUID FLOW SPEED MEASURING APPARATUS

[75] Inventors: Shigeru Aoshima, Chigasaki; Shoji Kamiunten, Kamakura; Shosaku Maeda, Atsugi, all of Japan

[73] Assignee: Yamatake-Honeywell Co., Ltd., Tokyo, Japan

[21] Appl. No.: 88,754

[22] Filed: Aug. 24, 1987

[51] Int. Cl.$^4$ .............................................. G01F 1/34
[52] U.S. Cl. ..................................... 73/861.42; 73/202
[58] Field of Search ........... 73/861.42, 861.52, 861.65, 73/861.66, 861.61, 202, 203

[56] References Cited

U.S. PATENT DOCUMENTS

| | | | |
|---|---|---|---|
| 3,803,921 | 4/1974 | Dieterich | 73/203 |
| 4,215,565 | 8/1980 | Zanker | 73/202 X |
| 4,546,655 | 10/1985 | Victor | 73/861.66 |
| 4,730,500 | 3/1988 | Hughes | 73/861.42 X |

Primary Examiner—Herbert Goldstein
Attorney, Agent, or Firm—Mitchell J. Halista; Albin Medved

[57] ABSTRACT

A fluid flow speed measuring apparatus comprising a first pipe having an opening exposed into a fluid to be measured, a direction of the opening having an angle larger than a critical negative pressure angle, a second pipe having an opening exposed into the fluid to be measured, a direction of the opening of the second pipe having an angle larger than the critical negative pressure angle and at least one of conditions such as a diameter, a direction, and the number of the openings for determining a magnitude of the negative pressure being different from that of the opening of the first pipe, negative pressure difference detector for detecting a difference between negative pressures acting on the openings of the first and second pipes, and device for calculating a flow speed of the fluid to be measured on the basis of an output from the negative pressure difference detector.

18 Claims, 13 Drawing Sheets

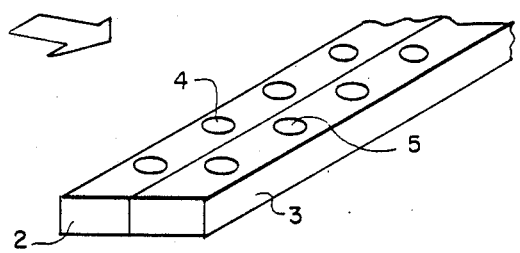
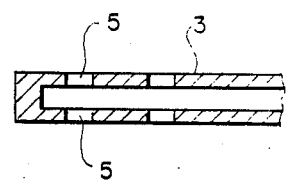
FIG. 16(a)  FIG. 16(b)
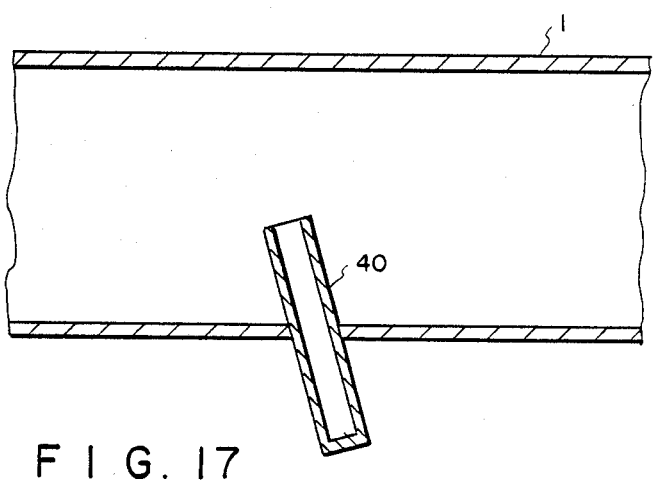
FIG. 17
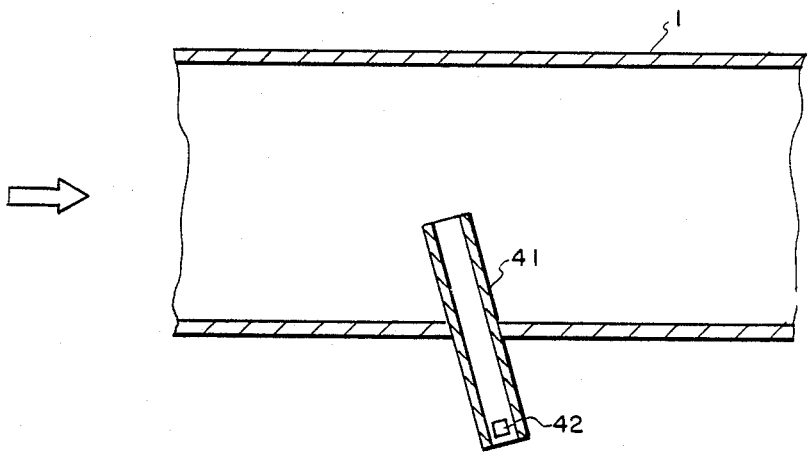
FIG. 18

A: R < Rcv (R = $10^5$)
B: R > Rcv (R = $7 \times 10^5$)
C: R > Rcv (R = $84 \times 10^5$)

FLUID FLOW SPEED MEASURING APPARATUS

BACKGROUND OF THE INVENTION

1. Field of the Invention

The present invention relates to a fluid flow speed measuring apparatus. More specifically, the present invention is directed to fluid flow speed measuring apparatus for measuring a flow speed of a fluid flowing inside a large diameter pipe and containing entrained solids.

2. Description of the Prior Art

Devices for measuring a flow speed or flow rate of a fluid based on various principles have been proposed and put into practical use. Examples are an orifice-type flow rate measuring apparatus, a pitot-type flow speed measuring apparatus, a hot-wire current meter, an electromagnetic flowmeter, and the like. However, no apparatus has been developed which is suitable for measuring a flow speed of a flow rate of air and the like containing a large amount of entrained dust and the like and flowing inside a large diameter air-supply pipe or a combustion exhaust-gas pipe having an inner diameter of about 5 to 10 m and installed in an operating environment, e.g., an iron producing plant. In an orifice-type flow rate measuring apparatus, an orifice itself mounted on a large diameter pipe is not practical and dust inside the pipe adheres thereto so that a satisfactory measurement accuracy cannot be obtained. In a pitot-type flow speed measuring apparatus, a large diameter of a pipe is not a problem but clogging of a pitot pipe presents a problem. That is, a total pressure hole of the pitot pipe opened toward a flow so as to measure a total pressure of the flow is quickly clogged by dust contained in a fluid to be measured such as combustion exhaust gas. In a hot-wire current meter, which cools a thermistor or the like heated by Joule heat by a fluid to be measured and measures a flow speed on the basis of an extent of cooling, changes over time in measurement outputs are undesirably large because of adhesion of the dust in the fluid. In addition, this hot-wire current meter is liable to break because a metal filament or a thermistor as a sensor element is directly exposed to the fluid. Furthermore, in an electromagnetic flowmeter utilizing the Faraday's law of electromagnetic induction, as long as a fluid is electrically conductive, measurement can be performed even if the fluid has high viscosity or fine particles are mixed therein. However, since a fluid to be measured is limited to a conductive fluid, a flow rate of a nonconductive fluid such as air cannot be measured.

SUMMARY OF THE INVENTION

An object of the present invention is to provide an improved fluid flow speed measuring apparatus suitable for use in large diameter pipes on a fluid having entrained solids.

In accomplishing this and other objects, there has been provided, in accordance with the present invention, a fluid flow speed measuring apparatus comprising a first pipe having an opening exposed into a fluid to be measured, a direction of said opening having an angle larger than a critical negative pressure angle, a second pipe having an opening exposed into the fluid to be measured, a direction of said opening of said second pipe having an angle larger than the critical negative pressure angle and at least one of conditions such as a diameter, a direction, an arrangement, and the number of said openings for determining a magnitude of the negative pressure being different from that of said opening of said first pipe, negative pressure difference detecting means for detecting a difference between negative pressures acting on the openings of said first and second pipes, and operating means for calculating a flow speed of the fluid to be measured on the basis of an output from said negative pressure difference detecting means.

BRIEF DESCRIPTION OF THE DRAWINGS

A better understanding of the present invention may be had when the following description is read in connection with the accompanying drawings, in which:

FIGS. 16(a) and 16(b) are views for explaining still another embodiment of the present invention, FIGS. 17 and 18 show embodiments in which a single measurement pipe is used.

DESCRIPTION OF THE PREFERRED EMBODIMENT

Figure 1:
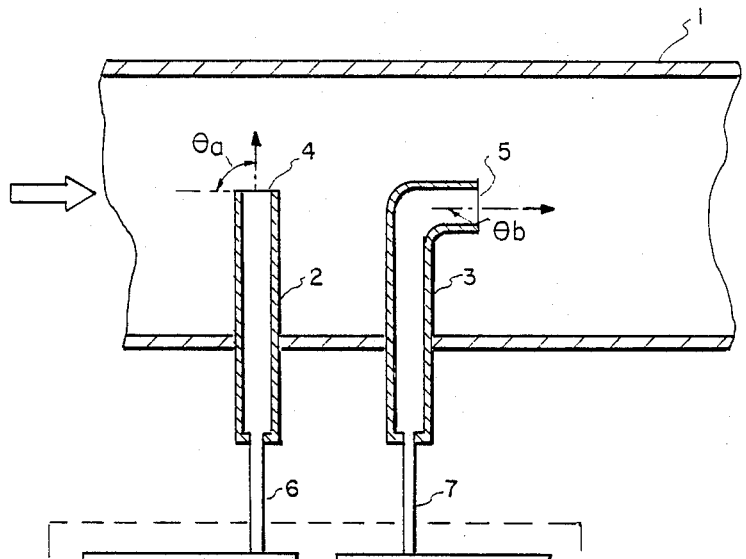
FIG. 1 is a schematic view showing an example of an embodiment of the present invention.

A negative pressure phenomenon based on flow of a fluid to be measured is generated at an opening portion of a measurement pipe projecting into the fluid to be measured. Since a negative pressure varies in accordance with a flow speed of the fluid to be measured, the flow speed of the fluid to be measured can be obtained from a value of the negative pressure in the measurement pipe on the basis of a calibration curve or the like obtained beforehand by measurement. The embodiments of the present invention will now be described in detail below with reference to the accompanying drawings. FIG. 1 shows an overall arrangement of an embodiment of the present invention. A pipe 1, e.g., a duct, has a fluid to be measured flowing therein in a direction indicated by an arrow. First and second pipes 2 and 3 for detecting a flow speed extend through the wall of the pipe 1. The first pipe 2 has an opening 4 at its distal end portion, and the opening 4 is in a direction perpendicular to the flow of the fluid to be measured. An opening 5 is provided at the distal end of the second pipe 3 and faces the downstream side of the fluid to be measured. A tube 6 extends from the bottom of the first pipe 2 to a pressure gage 9, and a tube 7 extends from the second pipe 3 to a pressure gage 10. The pressure gages 9 and 10 are means for detecting the internal pressures of the first and second pipes 2 and 3, respectively, and output terminals thereof are respectively connected to the input terminals of an operating means 11. In accordance with outputs from the pressure gages 9 and 10, the operating means 11 calculates the difference between the negative pressures acting on the openings 4 and 5 of the first and second pipes 2 and 3, respectively, and constitutes a negative pressure detecting means 8 together with the pressure gages 9 and 10. The output terminal of the negative pressure difference detecting means 8, i.e., the output terminal of the operating means 11 is connected to the input terminal of an operating means 12. The operating means 12 calculates a flow speed of the fluid to be measured corresponding to an output from the negative pressure difference detecting means in accordance with a characteristic curve obtained beforehand by measurement. The flow speed of the fluid to be measured thus obtained may be displayed oh a display means (not shown) or becomes an input signal for a control system (not shown).

Figure 19:
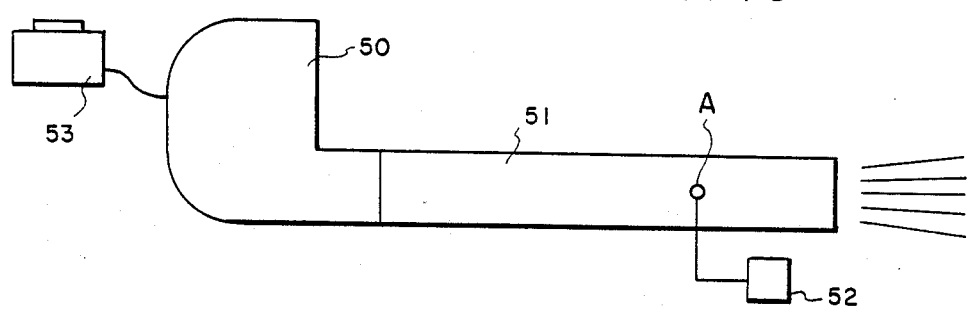
FIG. 19 is a schematic view showing an experimental device for explaining a basic principle of the present invention.

A principle of operation of the present invention will be described below. FIG. 19 is a schematic view of an arrangement of an experimental device. The experiment was conducted such that an air stream was produced by a fan motor 50 and an air duct 51 connected thereto, and an internal pressure of a pipe for measuring a flow speed inserted into the air duct 51 (at a point A) was measured by a manometer 52. A flow speed of the air inside the air duct 51 could be adjusted to vary by a motor current control 53 and could be measured independently by a commercially available current meter.

Figure 20:
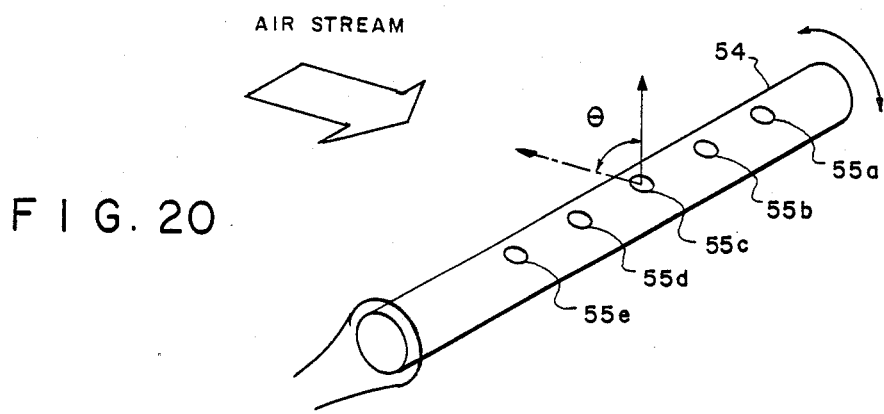
FIG. 20 is a perspective view of a measurement pipe used in the experiment for explaining the basic principle.
Figure 21:
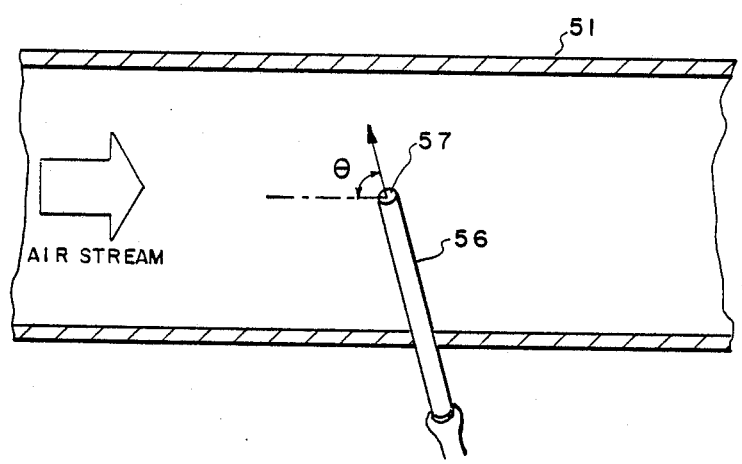
FIG. 21 is a view for explaining how the measurement pipe is mounted in the experiment for explaining the basic principle.

In this experiment, two kinds of the pipe for measuring a flow speed were used. One of them is a pipe 54 shown in FIG. 20. The pipe 54 is obtained by forming five openings 55a to 55e each having a diameter of 2 mm at 10 mm intervals on the surface of a circular pipe, the distal end of which is sealed, and which has an outer diameter of 6 mm and an inner diameter of 4 mm. The pipe 54 is perpendicularly and pivotally inserted in the wall of the pipe 51 so that a direction of the openings 55a to 55e can be freely varied with respect to an air stream (hollow arrow). In this case, assume that an angle obtained when the openings 55a to 55e face the air stream is 0°, an opening angle $\theta$ (note that $0° \leq \theta 180°$) is defined clockwise with reference to this angle. That is, when the openings 55a to 55e completely turn their backs to the air stream, the opening angle is 180°. The other pipe 56 is a circular pipe having an opening 57 only at its distal end portion and having an outer diameter of 6 mm and an inner diameter of 4 mm. The opening angle $\theta$ is defined similarly to that of the pipe 54.

Figure 22:
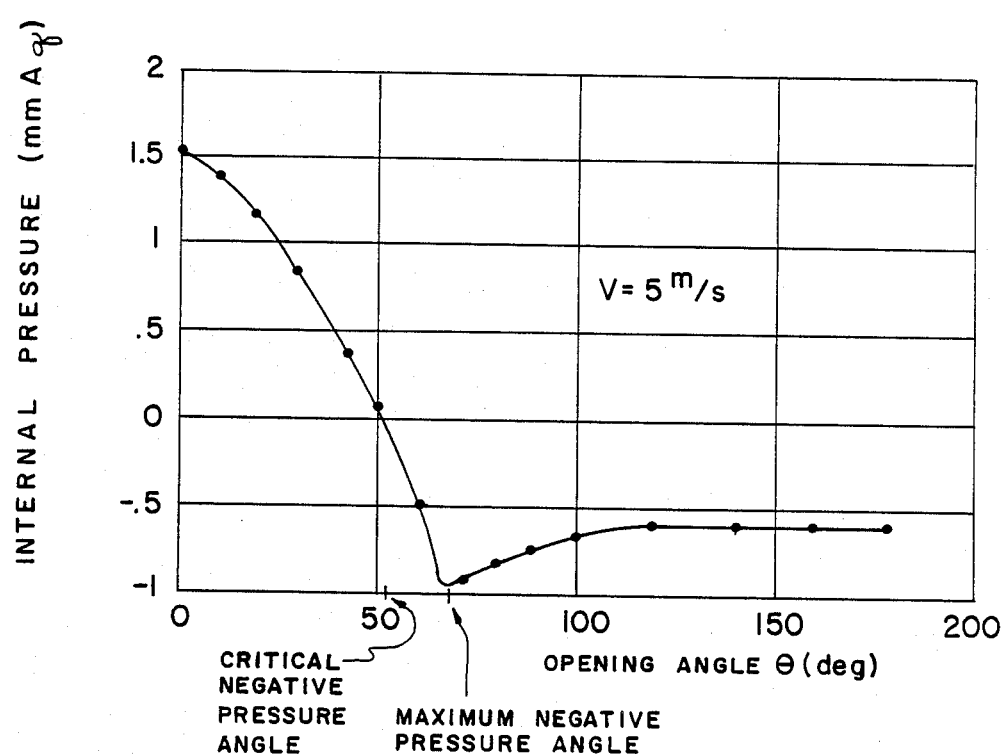
FIGS. 22 and 23 are graphs showing the experimental data relating to a relationship between the opening angle $\theta$ of the measurement pipe and the internal pressure in the experiment for explaining the basic principle.
Figure 23:
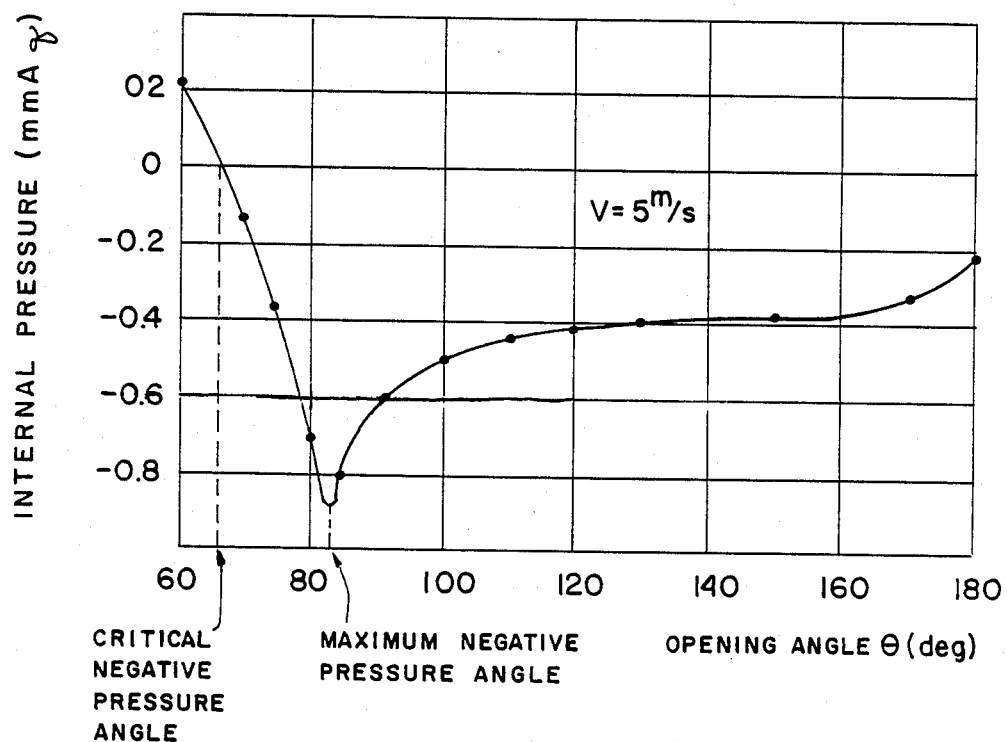

In the experimental device as described above, when the opening angle $\theta$ was varied while a flow speed of air inside the air duct 51 was maintained constant, results as shown in FIGS. 22 and 23 were obtained. FIGS. 22 and 23 respectively show dependency of an internal pressure in each of the pipes 54 and 56 with respect to the opening angle $\theta$. In FIGS. 22 and 23, the abscissa represents the opening angle $\theta$, and the ordinate represents a gage pressure of an internal air pressure expressed by water head [mmAq]. Note that in this experiment, the flow speed of air was set to be 5 m/s.

According to the experimental data, it is seen that the internal air pressure of each of the pipes 54 and 56 becomes negative when the opening angle $\theta$ becomes larger than a predetermined value, and that the internal air pressure is varied in accordance with the opening angle $\theta$. For example, according to the experimental data shown in FIG. 22, when the pipe 54 having a plurality of openings at its side wall is used, the opening angle $\theta$ (to be referred to as a critical negative pressure angle hereinafter) over which the internal pressure becomes negative is about 50°, and the opening angle $\theta$ corresponding to a maximum negative pressure (to be referred to as a maximum negative pressure angle hereinafter) is about 70°. On the other hand, according to the experimental data shown in FIG. 23, when the pipe 56 having a single opening at its distal end portion is used, the critical negative pressure angle is about 65°, and the maximum negative pressure angle is about 85°. Note that these values of the critical negative pressure angle and the maximum negative pressure angle are merely examples because they are varied in accordance with the shapes of the pipes 54 and 56 and the openings 55 and 57, a Reynolds number, or the presence/absence of a straightening vane and the like provided before the flow.

Figure 24A:
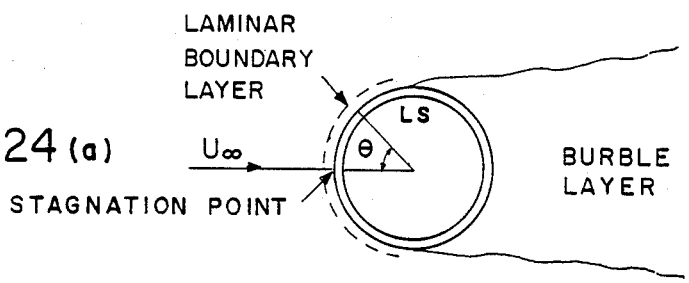
FIGS. 24(a) to 24(c) are views and FIGS. 24(d) is a graph for explaining the basic principle.
Figure 24B:
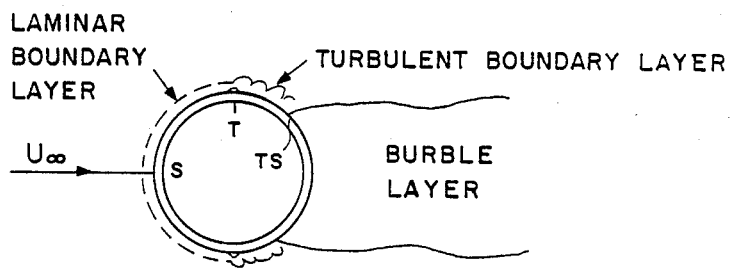
Figure 24C:
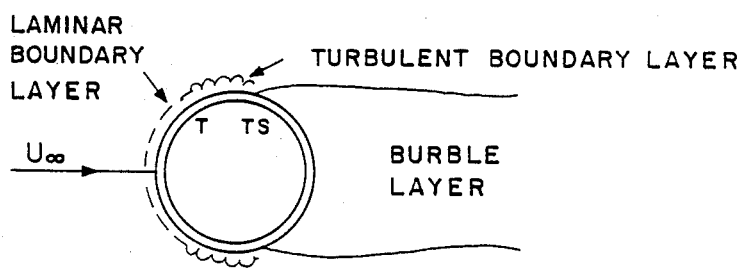

The discovery that the internal pressure of each of the pipes 54 and 56 becomes negative as described above means that a so-called blowing phenomenon is generated from the openings 55a to 55e and 57 toward the air duct. In the case of the pipe 54, it is assumed that this blowing phenomenon is based on various phenomena of the air flowing on the surface of the circular pipe, as described in, e.g., The Complete Treatise in Mechanical Engineering, Vol. 12, "Fluid Engineering" (July 1, 1982, Corona Ltd.), the flow around a cylinder is as shown in FIGS. 24(a) to 24(c) in which reference symbols P∞ and U∞ respectively denote a fluid pressure and flow speed at a front infinity, and reference symbol Rcr denotes a critical Reynolds number. FIG. 24(a) shows the case wherein the Reynolds number is smaller than Rcr; FIG. 24(b), the Reynolds number is larger than Rcr; and FIG. 24(c), the Reynolds number is larger than Rcr; and FIG. 24(c), the Reynolds number is much larger than Rcr. In addition, FIG. 24(d) is a graph showing a relationship between $$(P-P\infty)/(\tfrac{1}{2}pU\infty^2)$$

and a positional angle $\theta$ at a measurement point based on a front position, and data represented by solid lines A to C respectively correspond to FIGS. 24(a) to 24(c).

Figure 24D:
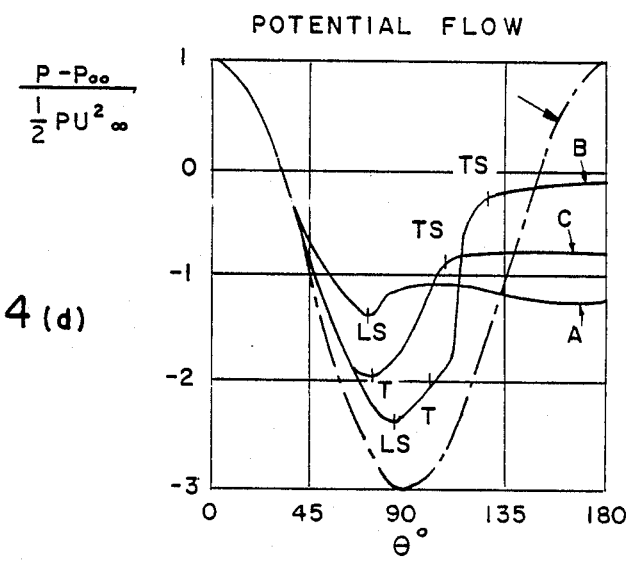

As is apparent from FIG. 24(d), a fluid pressure P on the circular pipe surface is decreased from $$P=P\infty+\tfrac{1}{2}pU\infty^2$$

at a stagnation point as the angle $\theta$ is increased, becomes $$P<P\infty$$

near $\theta=30°$, and gives a minimal value near the start point of the burble phenomenon when the Reynolds number is small or near the generation point of a turbulent boundary layer when the Reynolds number is large. Thus, if an opening is provided on the surface of the circular pipe, a pressure in the pipe can be considered to correspond to a total pressure obtained when a flow speed is zero. Therefore, it is assumed that the blowing phenomenon is generated at the opening from inside to outside the pipe.

Figure 25:
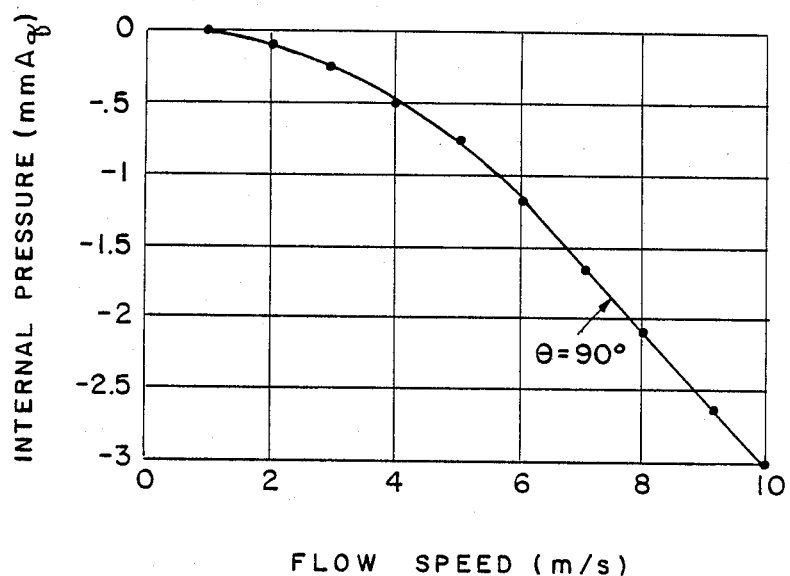
FIG. 25 is a graph showing the experimental data relating to a relationship between the flow speed of the fluid to be measured and the internal pressure in the measurement pipe in the experiment for explaining the basic principle.

An experiment for examining how the negative pressure phenomenon varies with respect to the flow speed will now be described below. According to this experiment, the pipe 54 (note that a diameter of an opening is 2 mm) is set such that the opening angle 0=90°, and the flow speed of air in the air duct 51 is varied, thereby detecting a pressure in the pipe 54 in accordance with a change in flow speed of air. FIG. 25 is a graph showing the experimental results, in which the abscissa represents a flow speed [m/s] of air, and the ordinate represents a water head [mmAq] of a gage pressure of an air pressure in the pipe 54. As is apparent from FIG. 25, the negative pressure phenomenon is enhanced as the flow speed is increased.

Figure 26:
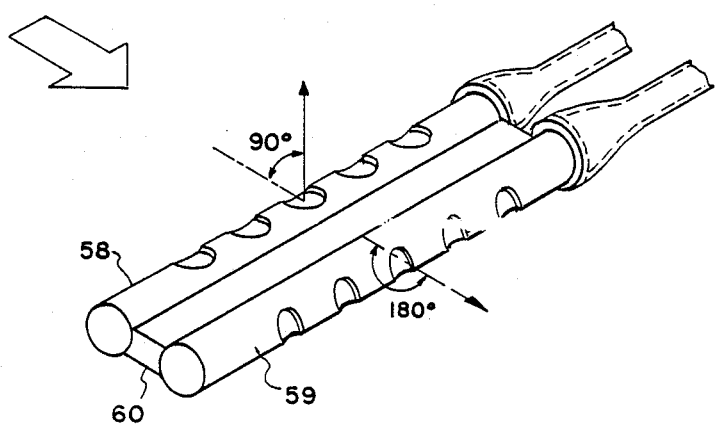
FIG. 26 is a perspective view showing an example of the measurement pipe used in the experiment for explaining the basic principle.
Figure 27:
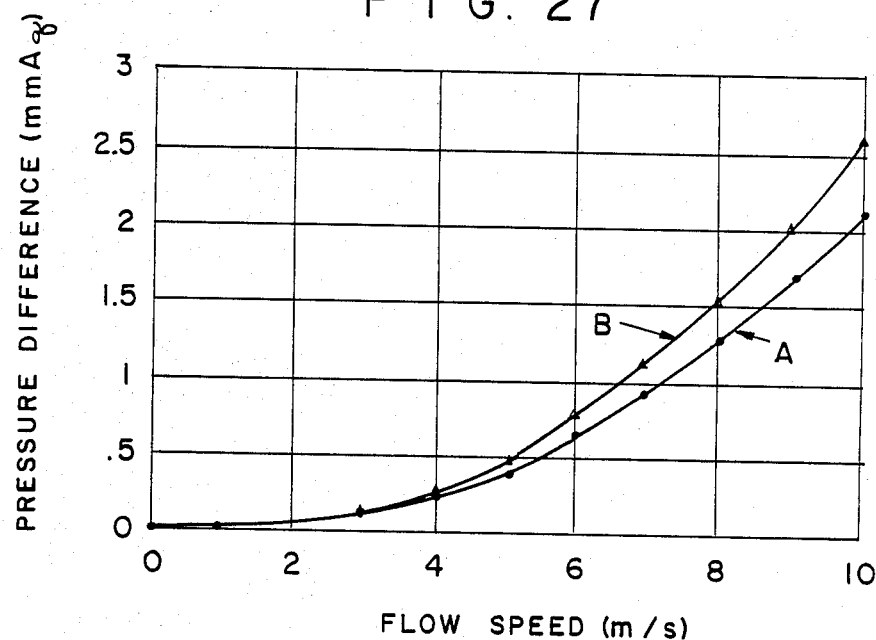
FIG. 27 is a graph showing the experimental data relating to a relationship between the flow speed of the fluid to be measured and the pressure difference of the measurement pipe when the measurement pipe of FIG. 26 is used.

In addition, an experiment was conducted for examining how a negative pressure difference between two measurement pipes as shown in FIG. 26 varies with respect to the flow speed of the fluid to be measured. The measurement pipe shown in FIG. 26 is obtained by fixing pipes 58 and 59 parallel to each other through a spacer 60 such that a central interval is about 10 mm. Each of the pipes 58 and 59 has five openings, and an opening direction of the pipe 58 is offset from that of the pipe 59 by 90°. The measurement pipe was set in the air duct 51 such that the opening angle of the pipe 58 was 90° and that of the pipe 59 was 180°. Thereafter, how a difference between the internal pressures of the pipes 58 and 59 varies with respect to the flow speed of the fluid to be measured was observed. FIG. 27 is a graph showing the results of this experiment, in which the abscissa represents the flow speed [m/s] of the air (fluid to be measured), and the ordinate represents a differential pressure [mmAq]. The experiment was conducted for the cases wherein the diameters of the opening were 2 mm and 3 mm. In FIG. 27, curve A corresponds to the opening diameter of 2 mm and curve B corresponds to the opening diameter of 3 mm. As is apparent from the experimental results, the negative pressure difference between the two measurement pipes having different opening angles $\theta$ is increased as the flow speed is increased. According to the above-mentioned experiments, when two pipes, between which at least one of conditions such as diameter, a direction, an arrangement, and the number of openings for determing a negative pressure is different are exposed in the fluid to be measured, a negative pressure difference between them changes along with a change in flow speed.

The embodiment shown in FIG. 1 utilizes the above discovery. In this embodiment, since opening angles of the first and second pipes 2 and 3 are different from each other, the following relationship is established between an internal pressure $P_1$ of the first pipe 2 and an internal pressure $P_2$ of the second pipe 3:

$$P_1<P_2<P_0$$

In addition, a pressure difference P between $P_1$ and $P_2$ with respect to flow speed V is as follows:

$$P_2-P_1=P=f(V)$$

(f(V): a monotonous increasing function)

Therefore, if f(V) is obtained beforehand as a calibration curve, the flow speed V can be obtained by measuring ΔP. ΔP is measured by the negative pressure difference detecting means 8, and the flow speed V is calculated by the operating means 12 in accordance with f(V) from the value of ΔP. Note that the operating means 12 can be easily realized by conventional techniques such as a microcomputer.

According to the flow speed measuring apparatus of the present invention utilizing such a negative pressure phenomenon, the internal pressures $P_1$ and $P_2$ of the first and second pipes 2 and 3 are lower than the internal pressure $P_0$ of the pipe 1, so that a so-called blowing phenomenon is generated to prevent dust in the fluid to be measured from entering into the apparatus. Therefore, the pressure gages 9 and 10 are less adversely affected, and stable measurement can be performed for a long time interval even if dust is mixed in the fluid to be measured. In addition, each of the first and second pipes 2 and 3 basically has a very simple arrangement, i.e., a mere circular pipe, so that a mechanically sufficient strength can be obtained, thereby providing a highly practical flow speed measuring apparatus.

An opening angle $\theta a$ of the first pipe 2 and an opening angle $\theta b$ of the second pipe 3 must be larger than the critical negative pressure angle at which the negative pressure phenomena appear, and the two negative pressure phenomena must be different from each other. That is, the following relation must be satisfied, but no other limitations are added thereto:

Critical Negative Pressure Angle$<\theta a$, $\theta b \leq 180°$ g($\theta a$)=g($\theta b$)

(where g($\theta$) is a magnitude of the negative pressure at an angle $\theta$)

However, in order to increase resolution of f(V), the opening angle a of the first pipe 2 is preferably set to be the maximum negative pressure angle, and the opening angle b of the second pipe 3 is preferably set to be 180° at which the negative pressure phenomenon is rather small and stable.

Figure 3:
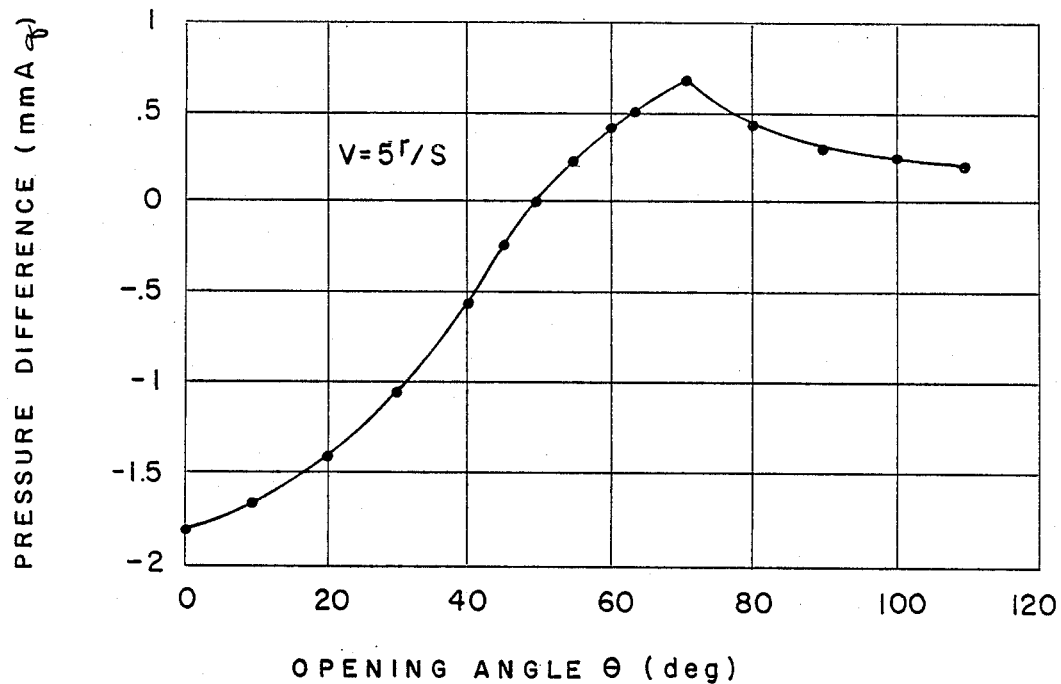
FIG. 3 is a graph showing the experimental data relating to a relationship between the opening angle $\theta$ of the first pipe 2 used in FIG. 1 and 2 and a pressure difference.

An experiment for examining the effect obtained when the opening angle $\theta a$ of the first pipe 2 is set to be the maximum negative pressure angle will be described below. In this experiment, the measurement pipe shown in FIG. 26 was used, the opening angle $\theta$ of a pipe 59 at the downstream side was fixed to be 180°, the opening angle $\theta$ of a pipe 58 at the upstream side was varied from 0° to 110°, and the negative pressure difference $\Delta P$ was measured. Note that a flow speed of the fluid to be measured was 5 m/s. The results are shown in FIG. 3. In FIG. 3, the abscissa represents the opening angle $\theta$ of the pipe 58, and the ordinate represents the difference $\Delta P$ [mmAq] between internal pressures of the pipes 58 and 59. The differential pressure $\Delta P$ is defined as follows:

$$\Delta P = P_2 - P_1$$

According to the experimental data, that in the case of using this measurement pipe, a maximum pressure difference is obtained when the opening angle $\theta$ of the pipe 58 is:

$$\theta \div 70°$$

Figure 4:
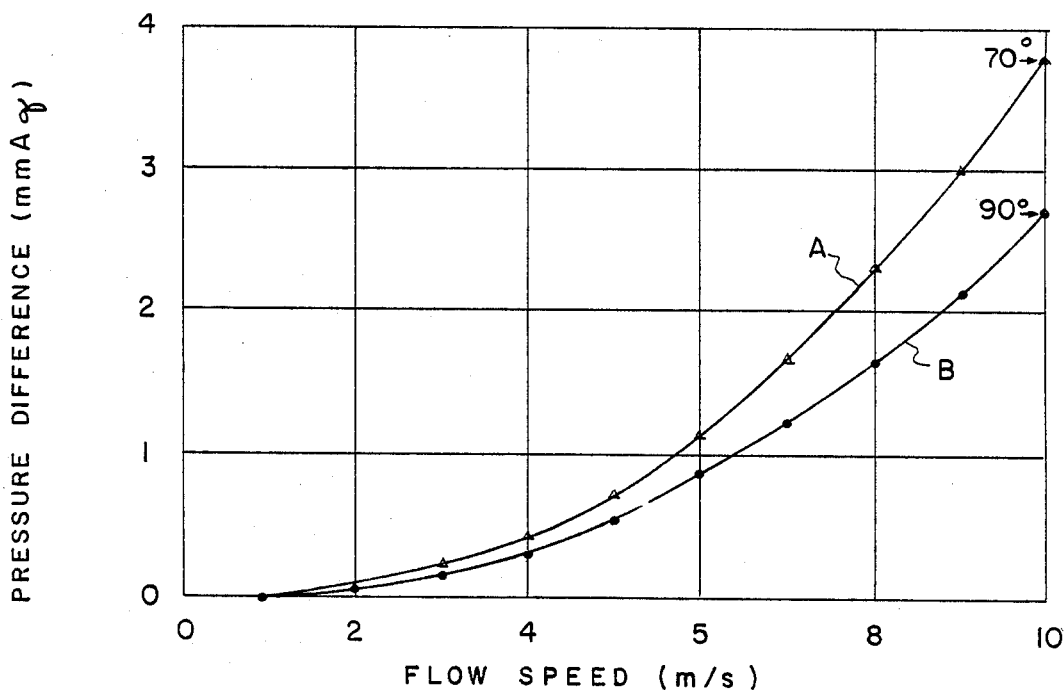
FIG. 4 is a graph showing the experimental data relating to a relationship between a flow speed of a fluid to be measured and the pressure difference.

FIG. 4 is a graph showing the relationship between a flow speed of air (fluid to be measured) and the differential pressure $\Delta P$ when the opening angle $\theta$ of the pipe 58 is set to be the maximum negative pressure angle ($\theta \div 70°$) (curve A), and when $\theta = 90°$ (curve B). In FIG. 4, the abscissa represents a flow speed [m/s] of air, and the ordinate represents the differential pressure $\Delta P$ [mmAq]. According to the experimental data, since $d\Delta P/dV$ can be increased when the opening angle $\theta$ is set to be the maximum negative pressure angle, measurement accuracy of the flow speed V can be increased.

Figure 2:
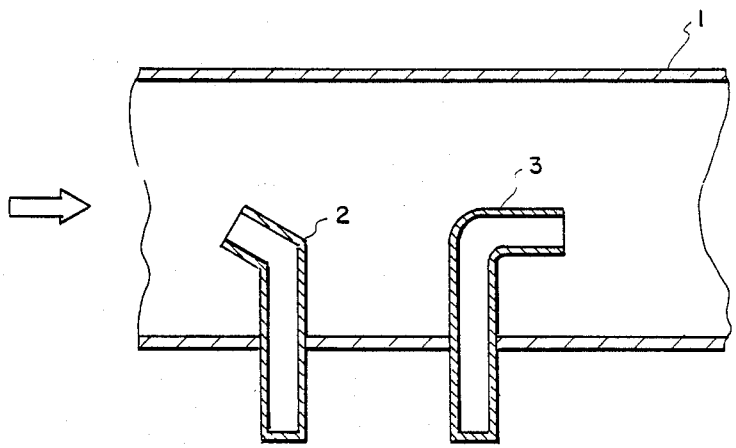
FIG. 2 is a cross-sectional view showing another example of the measurement pipe used in FIG. 1.

According to the above experiment, as shown in FIG. 2, the opening angle $\theta a$ of the first pipe 2 is preferably set to be the maximum negative pressure angle, and that the opening angle $\theta b$ of the second pipe 3 is preferably set to be 180° at which the negative pressure phenomenon is rather small and stable. Note that when the measurement pipe shown in FIG. 2, an average flow speed can be advantageously obtained.

Figure 5:
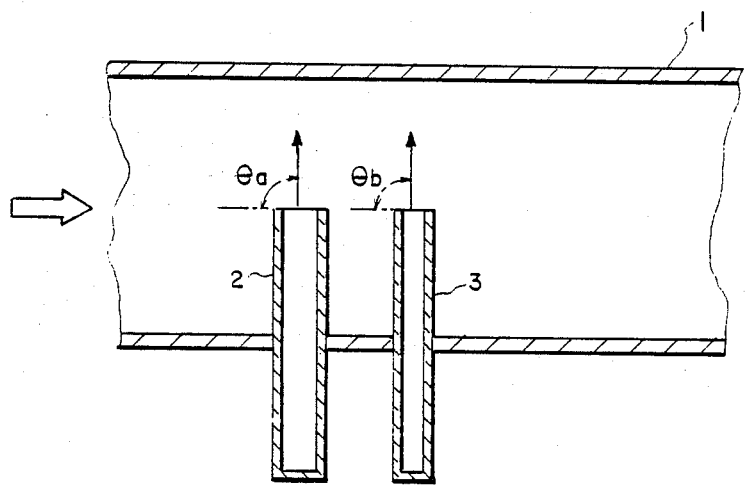
FIG. 5 is a sectional view showing still another example of the measurement pipe.

FIG. 5 shows a modification of the detection pipe of the embodiment shown in FIG. 1. In this modification, each of the opening angles $\theta a$ and $\theta b$ of the first and second pipes 2 and 3 is 90°, but an area of the opening 4 of the first pipe 2 is different from that of the opening 5 of the second pipe 3. An area ratio of the openings is thus varied to generate the negative pressure phenomena of different magnitudes and rates of change, thereby measuring the flow speed V of the fluid to be measured.

Figure 6:
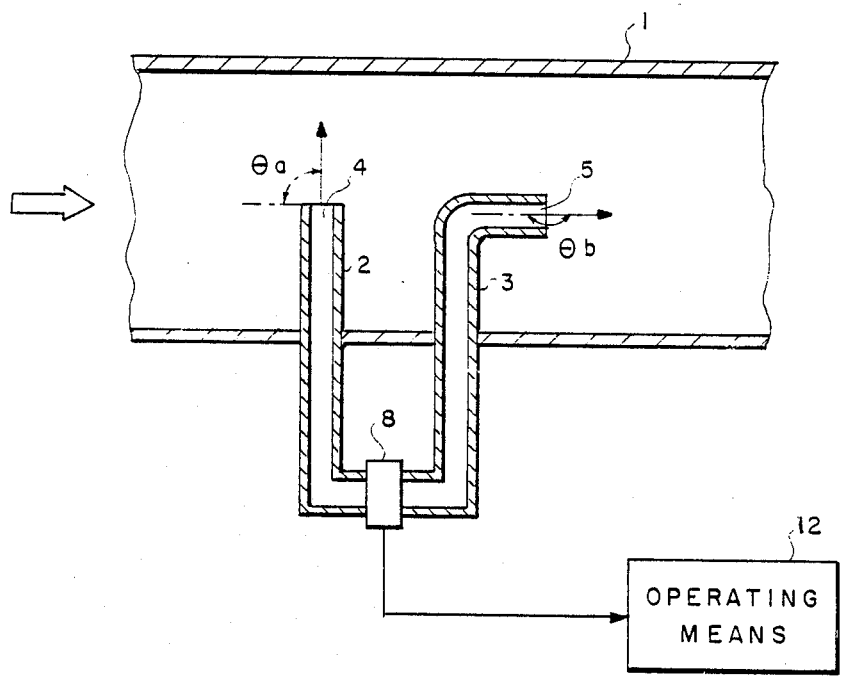
FIGS. 6 and 7 are, respectively, schematic views showing other embodiments of the present invention.

FIG. 6 shows another embodiment in which the negative pressure difference detecting means 8 of the embodiment shown in FIG. 1 is constituted by a single differential pressure gage. In this embodiment, a differential pressure between the internal pressures of the first and second pipes 2 and 3 is directly detected by the differential pressure gage, and an output therefrom is supplied to the operating means 12.

Figure 7:
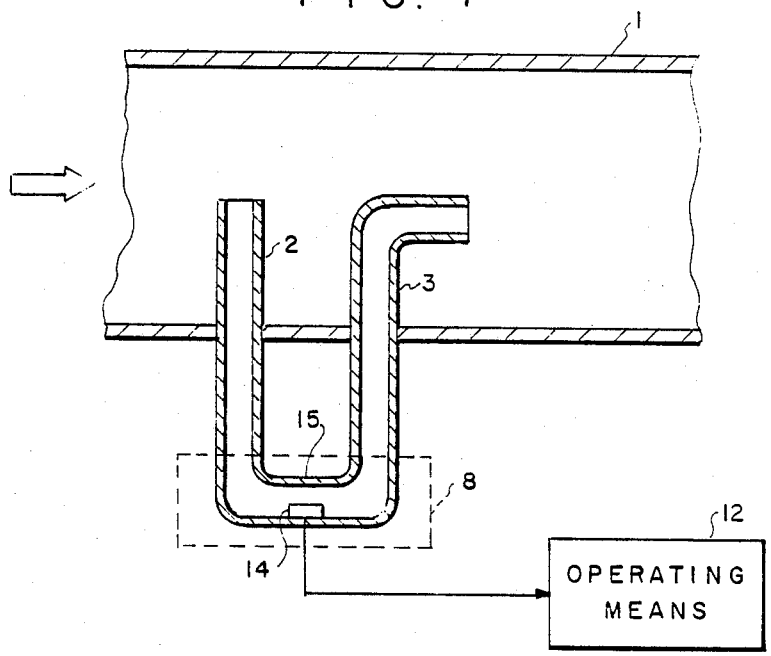

FIG. 7 shows still another embodiment in which the negative pressure difference is detected in accordance with flows generated in the first and second pipes 2 and 3. In this embodiment, the negative pressure difference detecting means 8 is constituted by a communication pipe 15 for coupling the first and second pipes 2 and 3, and a flow speed or flow rate detecting means 14 for detecting a flow speed or a flow rate of a fluid flowing through the communication pipe 15. That is, a flow can be generated in the communication pipe 15 due to a difference between the negative pressure phenomena generated in the first and second pipes 2 and 3. An output from the flow rate or flow speed detecting means 14 is supplied to the operating means 12 and converted into the flow speed of the fluid to be measured. Note that a relationship between the output from the flow speed or flow rate detecting means 14 and the flow speed of the fluid to be measured is obtained in advance by measurement and is stored in the operating means 12 as a calibration curve.

Figure 8A:
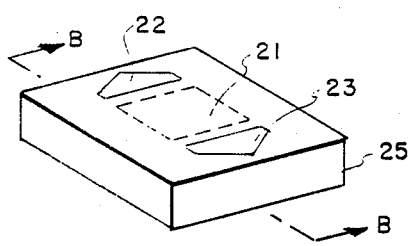
FIGS. 8(a) to 8(d) are views for explaining an example of a flow speed detecting means.
Figure 8B:
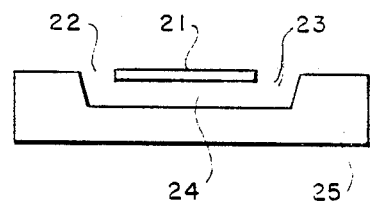
Figure 8C:
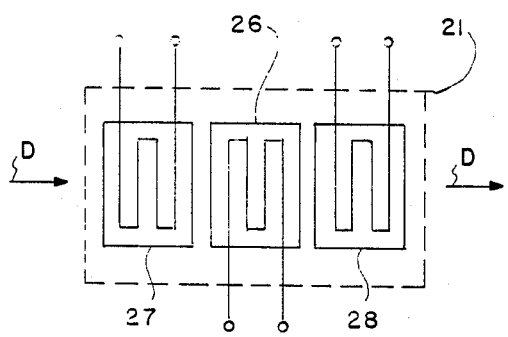
Figure 8D:
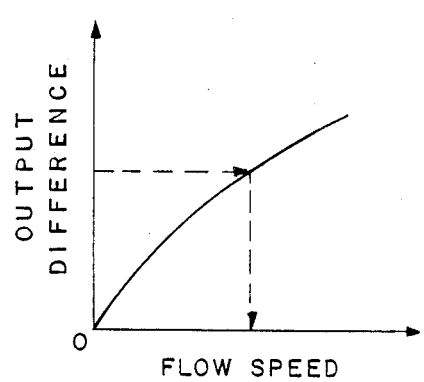

FIGS. 8(a) to 8(d) show a suitable example of the flow speed or flow rate detecting means 14. This flow speed or flow rate detecting means 14 constitutes a thermal wind speed detector by a bridge construction based on an anisotropy technique for semiconductors. A detection section of this means 14 is thermally separated from a semiconductor substrate and can detect an extremely slow flow speed. FIG. 8(a) is a perspective view, and FIG. 8(b) is a cross-sectional view taken along the line B—B of FIG. 8(a). A through hole 24 is formed immediately below a region 21 surrounded by a broken line to cause a left opening 22 to communicate with a right opening 23. That is, since the region 21 is spatially separated from a semiconductor base 25 in a bridge-like manner, the region 21 is thermally insulated from the semiconductor base 25. As schematically shown in FIG. 8(c), on the surface of the region 21, a thin film heater element 26 is formed and thin film temperature-measuring resistor elements 27 and 28 are formed to sandwich the heater element 26. In FIG. 8(c), when the fluid flows in a direction indicated by an arrow D, the temperature-measuring element resistor element 27 on the upstream side is cooled. Since the fluid heated by the heater element 26 flows in the same direction, the temperature-measuring resistor element 28 is heated. For this reason, a difference is generated between outputs from the temperature-measuring resistor elements 27 and 28, and the flow speed of the fluid can be detected in accordance with this output difference as shown in FIG. 8(d).

Figure 9:
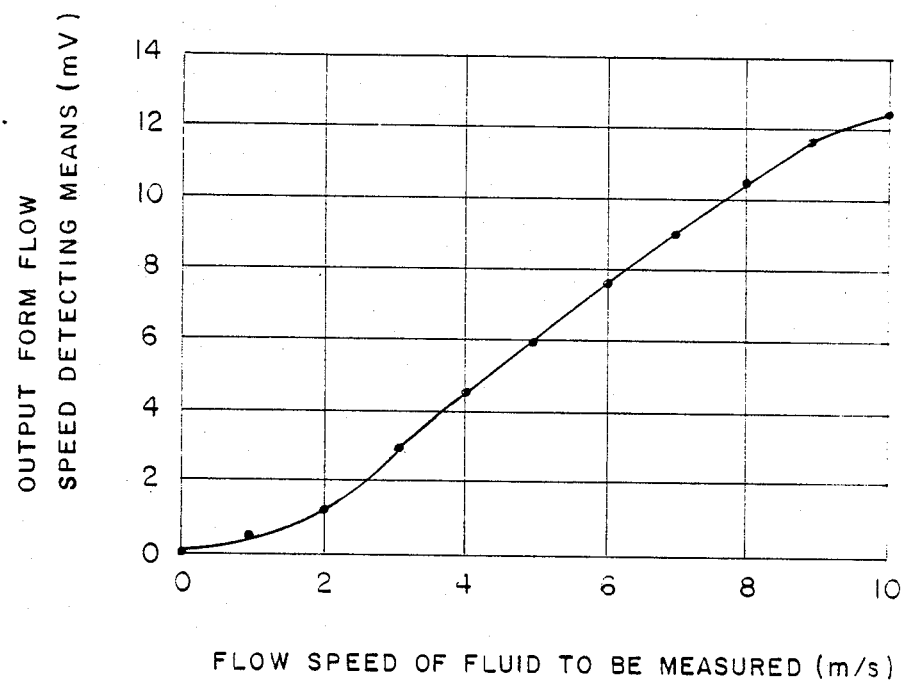
FIG. 9 is a graph showing the experimental data relating to a relationship between the flow speed of the fluid to be measured and an output from the flow speed detecting means.

FIG. 9 shows experimental data obtained when the flow speed or flow rate detecting means 14 is applied to the embodiment shown in FIG. 7. In FIG. 9, the abscissa represents the flow speed [m/s] of the fluid to be measured, and the ordinate represents an output from the flow speed or flow rate detecting means 14, i.e., an output [mV] from a bridge circuit constituted by the temperature-measuring resistor elements 27 and 28. In this embodiment, the fluid to be measured flows from the second pipe 3. However, when the opening angle $\theta$ of the second pipe 3 is set around 180°, even if dust is included in the fluid to be measured, dust itself does not enter into the opening 5 because of movement of the dust. For this reason, the flow speed can be measured for a long time interval in this embodiment. Note that instead of the temperature-measuring resistor elements 27 and 28, a thermal wind speed detector which detects a wind speed in accordance with extent of cooling of the heater element 26 can be suitably used as the flow speed or flow rate detecting means 14.

Figure 10:
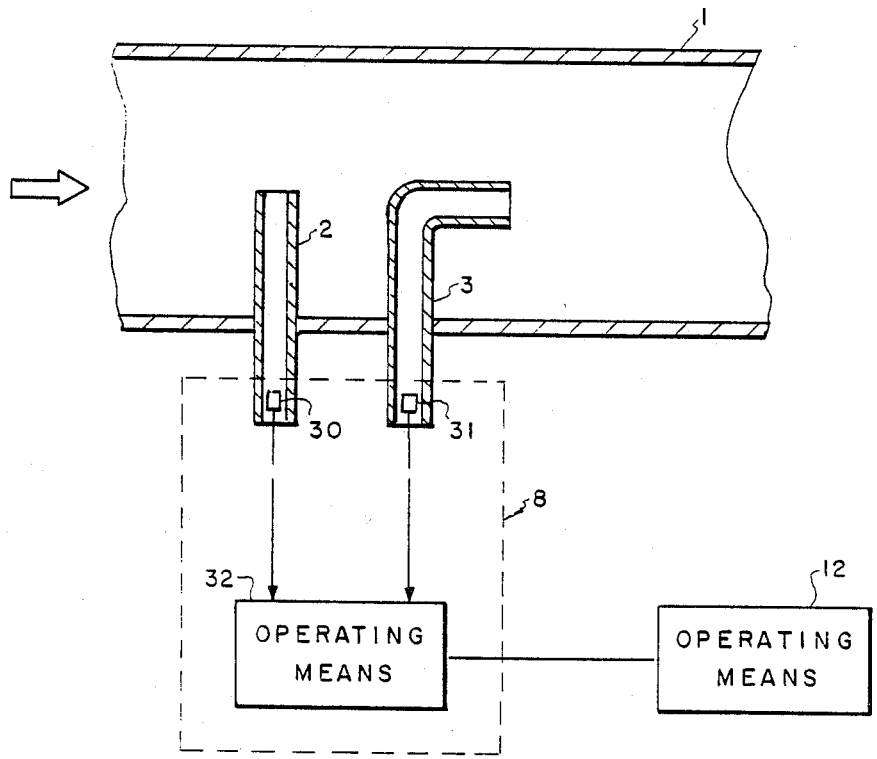
FIG. 10 is a schematic view showing still another embodiment of the present invention.

FIG. 10 shows still another embodiment in which the flow speed of the fluid to be measured is detected in accordance with flows generated in the first and second pipes 2 and 3 as in the embodiment shown in FIG. 7. However, unlike the embodiment of FIG. 7, both the pipes 2 and 3 are open to the atmosphere. In this embodiment, flow speed or flow rate detecting means 30 and 31 are respectively provided to the first and second pipes 2 and 3, and an operating means 32 receives outputs from the flow speed or flow rate detecting means 30 and 31 and calculates a negative pressure difference in accordance with a difference between the flow speeds or flow rates respectively detected thereby. The negative pressure difference detecting means 8 is constituted by the flow speed or flow rate detecting means 30 and 31 and the operating means 32. As in the embodiments described above, an output from the negative pressure detecting means 8 is supplied to the operating means 12, and the flow speed of the fluid to be measured is calculated. If a pressure of the fluid to be measured flowing inside the pipe 1 is close to the atmospheric pressure, the negative pressure state overcomes this pressure. Therefore, the atmosphere flows into the pipe 1 through the first and second pipes 2 and 3, and the fluid to be measured does not flow into the atmosphere.

In the various embodiments described above, the first pipe 2 having the larger negative pressure is disposed at the upstream side. However, the first pipe 2 may be disposed at the downstream side, or the two pipes 2 and 3 may be disposed such that a line connecting these pipes is perpendicular to the flow. In addition, values such as the maximum negative pressure angle shown in the experimental data are varied in accordance with the Reynolds number, shapes of the openings, and the like.

Figure 11:
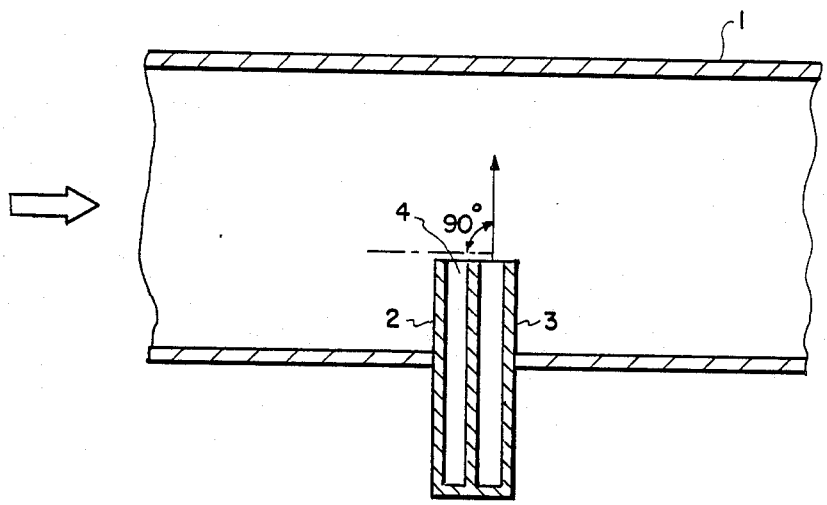
FIG. 11 is a sectional view showing still another example of the measurement pipe.

FIG. 11 shows still another embodiment of the present invention and is a sectional view of a measurement pipe. In the embodiments described above, the opening angles $\theta$ of the first and second pipes 2 and 3 are independently set or the opening areas are set to be different from each other, thereby generating the negative pressure states different from each other. The measurement pipe according to this embodiment is obtained by contacting the first and second pipes 2 and 3 each having the same diameters (an inner diameter of 4 mm and an outer diameter of 6 mm) such that the first pipe 2 is disposed at the upstream side and the second pipe 3 is disposed at the downstream side. In addition, each of the opening angles $\theta$ is 90°. Other arrangements are the same as those of the embodiment shown in FIG. 1. The following relationship is established between the internal pressure $P_1$ of the first pipe 2 disposed at the upstream side of the flow, the internal pressure $P_2$ of the second pipe 3, and the pressure $P_0$ of the fluid to be measured, as in the above embodiment:

$$P_1 - P_2 = \Delta P = f(V)$$

(f(V): monotonous increasing function)
It is assumed that this phenomenon is caused by burble of the flow generated at the distal end portion at the upstream side of the opening 4 of the first pipe 2.

Figure 12:
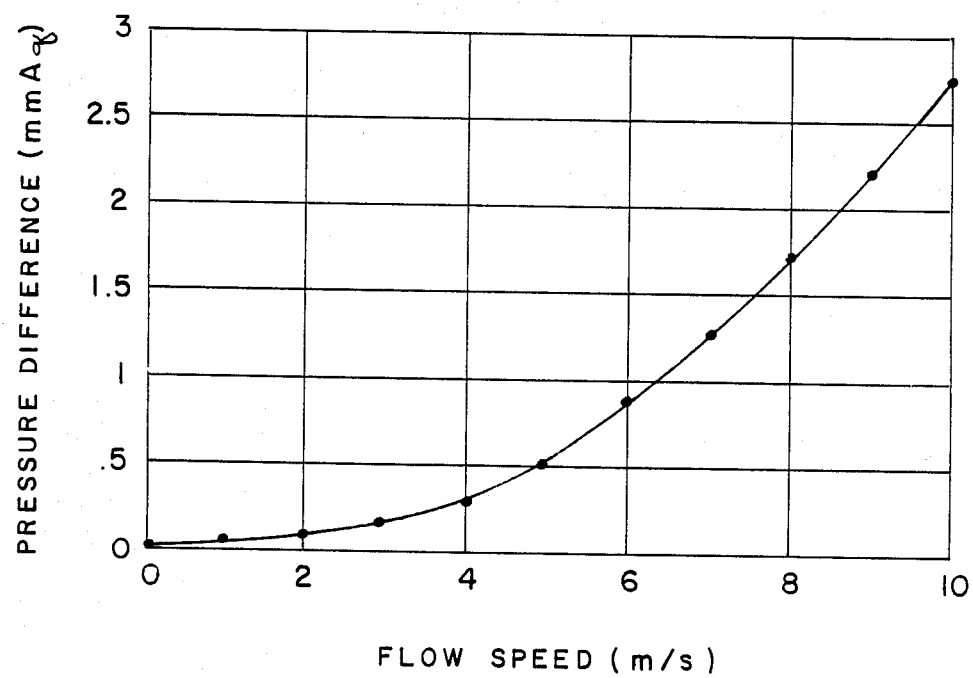
FIG. 12 is a graph showing the test data relating to a relationship between the flow speed of the fluid to be measured and the pressure difference obtained when the measurement pipe, shown in FIG. 11 is used.

FIG. 12 is a graph showing the result obtained by changing the flow speed of the fluid to be measured and plotting the differential pressure $\Delta P$ between $P_1$ and $P_2$ in this embodiment. The abscissa represents the flow speed [m/s], and the ordinate represents the differential pressure [mmAq]. According to this result, the flow speed of the fluid to be measured can be sufficiently detected with such an arrangement. An advantage of this embodiment is such that when the two contacting pipes 2 and 3 are of the same shape, the flow speed can be measured only by changing polarity of signal processing even if the flow is reversed.

Figure 13:
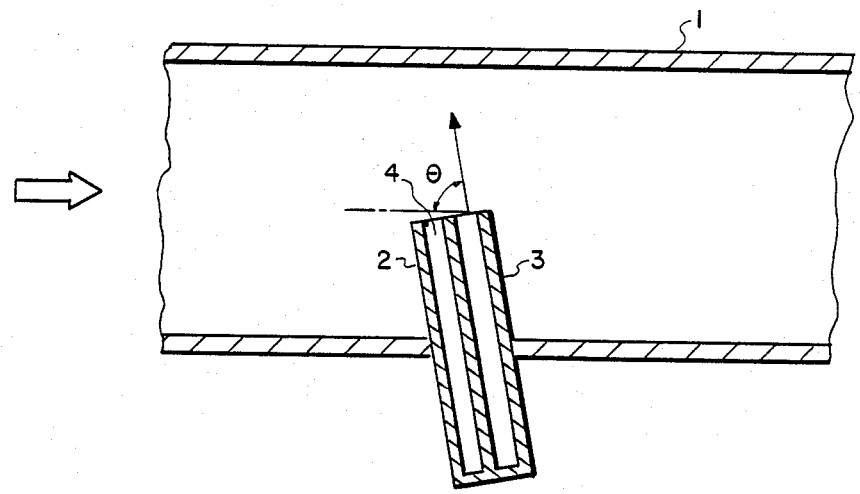
FIGS. 13 to 15 are, respectively, sectional views showing other examples of the measurement pipe.
Figure 14:
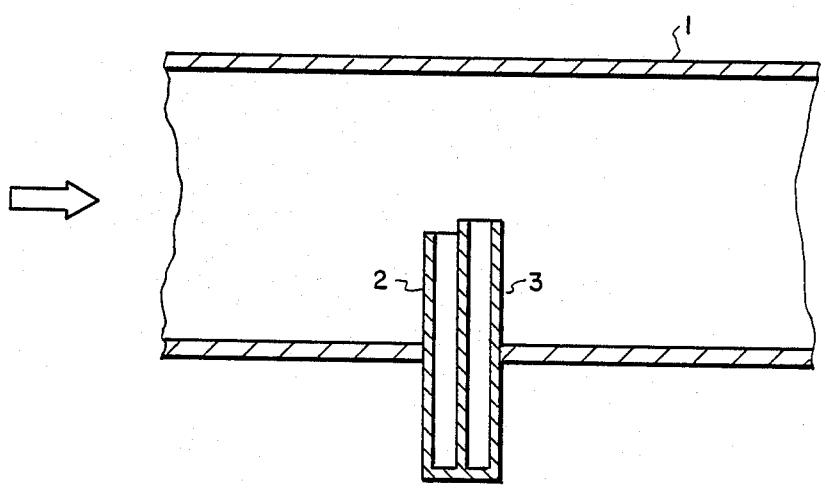

FIGS. 13 and 14 are sectional views respectively showing measurement pipes of other embodiments. When the first and second pipes 2 and 3 contacting with each other are inclined toward the upstream side so that the opening angle is set below 90° as shown in FIG. 13, or when the second pipe 3 at the downstream side is projected slightly than the first pipe 2 at the upstream side as shown in FIG. 14, a difference between the negative pressure states angle need be more than the critical negative pressure angle and is desirably the maximum negative pressure angle.

Figure 28:
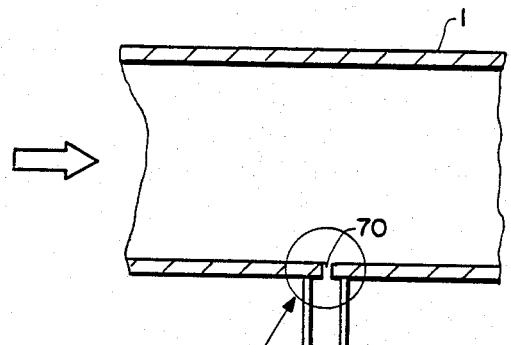
FIGS. 28 to 30 are sectional views respectively showing known static pressure measuring devices.
Figure 28:
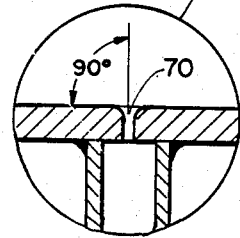
Figure 29:
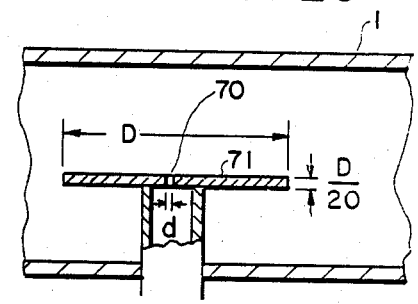
Figure 30:
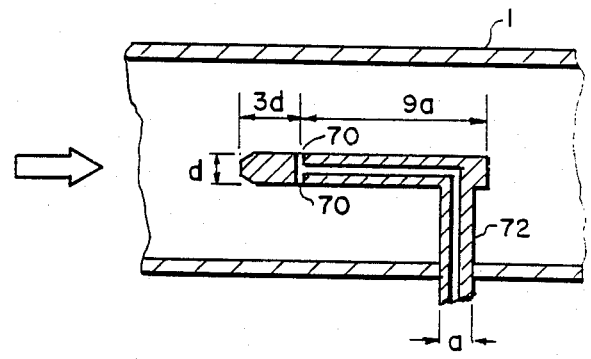

In the embodiments shown in FIGS. 17 and 18, when the pressure $P_0$ of the fluid to be measured is varied, known static pressure measuring devices respectively as shown in FIGS. 28 to 30 are used, so that the flow speed or the flow rate of the fluid to be measured can be obtained in accordance with a difference between a pressure obtained by the measurement pipes shown in FIGS. 17 and 18 and a pressure obtained by ther static pressure measuring devices shown in FIGS. 28 to 30. In FIGS. 28 to 30, reference numeral 70 denotes a static pressure hole; 71, a disk; and 72, a static pressure pipe.

Note that in the various embodiments described above, a circular pipe is mainly used as the measurement pipe, but the measurement pipe is not limited to this. In addition, in the embodiments having the first and second pipes, these two pipes may be integrally formed, or formed in a concentric double-structure. Furthermore, a description has been made with reference to the case wherein the present invention is applied to the flow speed measuring apparatus. However, it is a matter of course that if a cross-sectional area of the pipe in which the fluid to be measured flows is known, the present invention can be applied to a flow rate measuring apparatus by multiplying the cross-sectional area by the obtained flow speed. Therefore, the flow speed measuring is increased to improve measurement accuracy of flow speed measurement.

Figure 15:
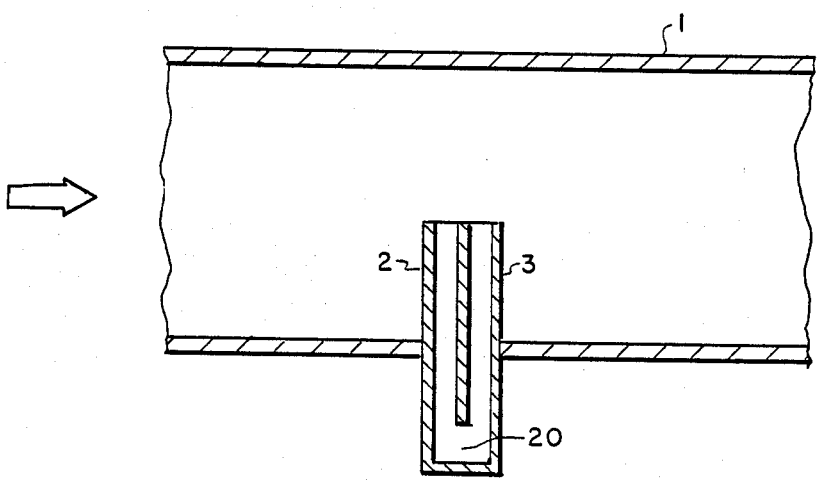

The measurement pipes shown in FIGS. 11, 13 and 14 can be replaced not only with that of the embodiment shown in FIG. 1 but also with those of the other embodiments described above. In addition, when the measurement pipe is replaced in the embodiments as shown in FIGS. 6 and 7, an opening 20 is formed at a contacting portion of the lower end portion as shown in FIG. 15, and a differential pressure gage or a flow speed or flow rate detecting means is disposed, resulting in a simple arrangement. In addition, when a measurement pipe having a plurality of openings is used as shown in FIG. 16, an average flow speed can be obtained.

FIGS. 17 and 18, respectively, show other embodiments in each of which a single pipe is used as a measurement pipe. When the pressure $P_0$ of the fluid to be measured is known, the flow speed of the fluid to be measured can be measured in accordance with a change in internal pressure on the basis of the principle described above. In the embodiment shown in FIG. 17, a closed pipe 40 is used, and the internal pressure is detected by a pressure gage. In the embodiment shown in FIG. 18, an open pipe 41 is used, and a flow speed or flow rate detecting means 42 similarly to the flow speed or flow rate detecting means as shown in FIG. 8 is provided to calculate the internal pressure. In these two embodiments, the opening apparatus of the present invention is equivalent to the flow rate measuring apparatus except a mere descriptional difference.

As has been described above, according to the flow speed measuring apparatus of the present invention, the negative pressure phenomenon based on the flow of the fluid to be measured is generated at the opening of the measurement pipe projecting in the fluid to be measured, and the flow speed of the fluid to be measured is obtained in accordance with the negative pressure. Therefore, even if a diameter of the pipe in which the fluid to be measured flows is large, an average flow speed can be easily obtained. In addition, since the negative pressure phenomenon is utilized, dust in the fluid to be measured, if any, hardly flows into the measurement pipe. For this reason, measurement can be performed for a long time interval without maintenance. Furthermore, since a portion exposed in the fluid to be measured is basically a simple pipe, a sufficient mechanical strength can be obtained.

The embodiments of the present invention in which an exclusive property or privilege is claimed are defined as follows:

1. A fluid flow speed measuring apparatus comprising
a first pipe having an opening exposed into a fluid to be measured, a direction of said opening having an angle larger than a critical negative pressure angle,
a second pipe having an opening exposed into the fluid to be measured, a direction of said opening of said second pipe having an angle larger than the critical negative pressure angle and at least one of conditions such as a diameter, a direction, an arrangement, and the number of said openings for determining a magnitude of the negative pressure being different from that of said opening of said first pipe and a direction of the opening of said first or second pipe is a maximum negative pressure angle,
negative pressure difference detecting means for detecting a difference between negative pressures acting on the openings of said first and second pipes, and
operating means for calculating a flow speed of the fluid to be measured on the basis of an output from said negative pressure difference detecting means.

2. An apparatus according to claim 1 wherein said negative pressure difference detecting means comprises a first pressure gage for detecting an internal pressure in said first pipe, a second pressure gage for detecting an internal pressure in said second pipe, and said operating means calculates a pressure difference between the internal pressures in said first and second pipes on the basis of outputs from said first and second pressure gages.

3. An apparatus according to claim 1 wherein said negative pressure difference detecting means comprises a differential pressure gage for directly measuring a differential pressure between the internal pressures in said first and second pipes.

4. An apparatus according to claim 1 wherein said negative pressure difference detecting means comprises a communication pipe for causing said first pipe to communicate with said second pipe, and a flowmeter for measuring a flow speed or a flow rate of the fluid in said communication pipe.

5. An apparatus according to claim 4 wherein flowmeter comprises a meter having a flow speed detecting section consisting of a thermally insulated heat generating body and a temperature-measuring resistor body for detecting a flow speed on the basis of a change in resistance of said temperature-measuring resistor body.

6. An apparatus according to claim 1 wherein part of each of said first and second pipes is opened to the atmosphere, and said negative pressure difference detecting means comprises a first flowmeter for measuring a flow speed of the fluid in said first pipe, a second flowmeter for measuring a flow speed of the fluid in said second pipe, and said operating means measures a difference between negative pressures acting on the openings of said first and second pipes on the basis of outputs from said first flowmeter and said second flowmeter.

7. An apparatus according to claim 6 wherein said flowmeter comprises a meter having a detecting section consisting of a thermally insulated heat generating body, for detecting a flow speed on the basis of a change in resistance of said heat generating body.

8. A fluid flow speed measuring apparatus comprising
a first pipe having an opening exposed into a fluid to be measured, a direction of said opening having an angle larger than a critical negative pressure angle,
a second pipe having an opening exposed into the fluid to be measured, a direction of said opening of said second pipe having an angle larger than the critical negative pressure angle and said opening of said second pipe being exposed into a burble layer of the fluid to be measured formed by said first pipe,
negative pressure difference detecting means for detecting a difference between negative pressures acting on the openings of said first and second pipes, and
operating means for calculating a flow speed of the fluid to be measured on the basis of an output from said negative pressure difference detecting means.

9. An apparatus according to claim 8 wherein a direction of the opening of each of said first and second pipes is a maximum negative pressure angle.

10. An apparatus according to claim 8 wherein said negative pressure difference detecting means comprises a first pressure gage for detecting an internal pressure in said first pipe, a second pressure gage for detecting an internal pressure in said second pipe, and said operating means calculates a pressure difference between the internal pressures in said first and second pipes on the basis of outputs from said first and second pressure gages.

11. An apparatus according to claim 8 wherein said negative pressure difference detecting means comprises a differential pressure gage for directly measuring a differential pressure between the internal pressures in said first and second pipes.

12. An apparatus according to claim 8 wherein said negative pressure difference detecting means comprises a communication pipe for causing said first pipe to communicate with said second pipe and a flowmeter for measuring a flow speed of the fluid in said communication pipe.

13. An apparatus according to claim 12 wherein said flowmeter comprises a meter having a flow speed detecting section consisting of a thermally insulated heat generating body and a temperature-measuring resistor body for detecting a flow speed on the basis of a change in resistance of said temperature-measuring resistor body.

14. An apparatus according to claim 8 wherein part of each of said first and second pipes is opened to the atmosphere and said negative pressure difference detecting means comprises a first flowmeter for measuring a flow speed of the fluid in said first pipe, a second flowmeter for measuring a flow speed of the fluid in said second pipe, and said operating means measures a difference between negative pressures acting on the openings of said first and second pipes on the basis of outputs from said first flowmeter and said second flowmeter.

15. An apparatus according to claim 14 wherein said flowmeter comprises a meter, having a detecting section consisting of a thermally insulated heat generating body for detecting a flow speed on the basis of a change in resistance of said heat generating body.

16. A fluid flow speed measuring apparatus comprising
a pipe having an opening exposed into a fluid to be measured, a direction of said opening having an angle larger than a critical negative pressure angle and wherein the direction of the opening of said pipe is a maximum negative pressure angle,
negative pressure detecting means for detecting a negative pressure acting on the opening of said pipe,
a static pressure measuring device for measuring a static pressure of the fluid to be measured, and
operating means for calculating a flow speed of the fluid to be measured on the basis of outputs from said negative pressure detecting means and from said static pressure measuring device.

17. An apparatus according to claim 16 wherein said negative pressure detecting means comprises a current meter having a detection section consisting of a thermally insulated heat generating body and a temperature-measuring resistor body for detecting a flow speed on the basis of a change in resistance of said temperature-measuring resistor body, and said operating means calculates a negative pressure acting on the opening of said pipe on the basis of an output from said current meter.

18. An apparatus according to claim 16 wherein said negative pressure detecting means comprises a current meter having a detection section consisting of a thermally insulated heat generating body for detecting a flow speed on the basis of a change in resistance of said heat generating body.

* * * * *